July 23, 1940.  L. J. JOHNSON ET AL  2,209,302
INBOARD MOTOR PLANT
Filed Feb. 26, 1937  2 Sheets-Sheet 1
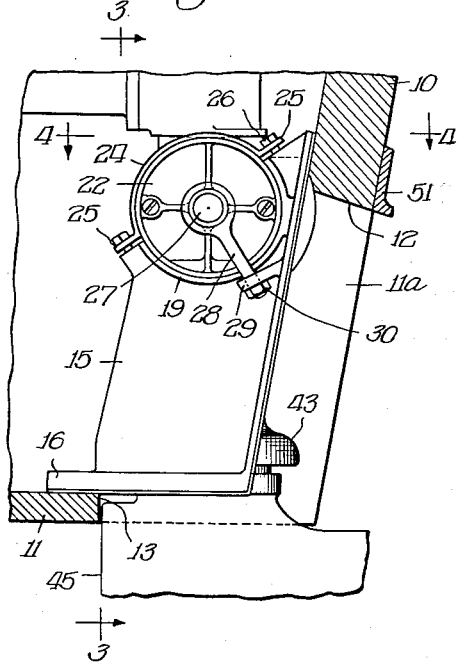
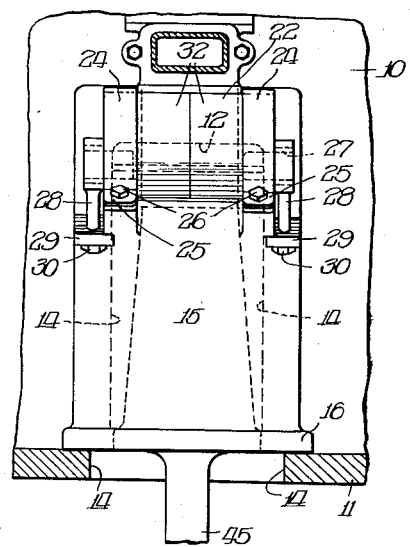
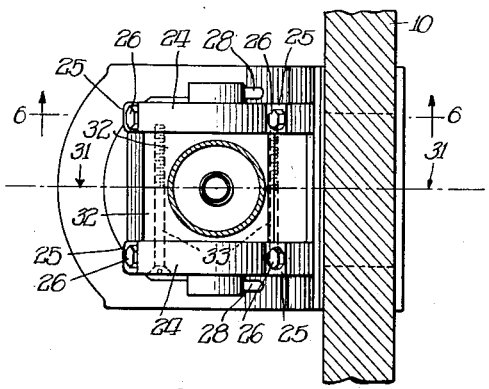
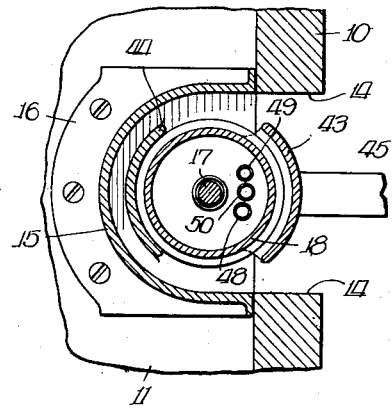
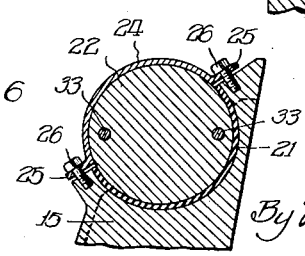
Inventors:
Louis J. Johnson,
Harry L. Johnson, July 23, 1940.                L. J. JOHNSON ET AL                  2,209,302
                                INBOARD MOTOR PLANT
                              Filed Feb. 26, 1937            2 Sheets-Sheet 2
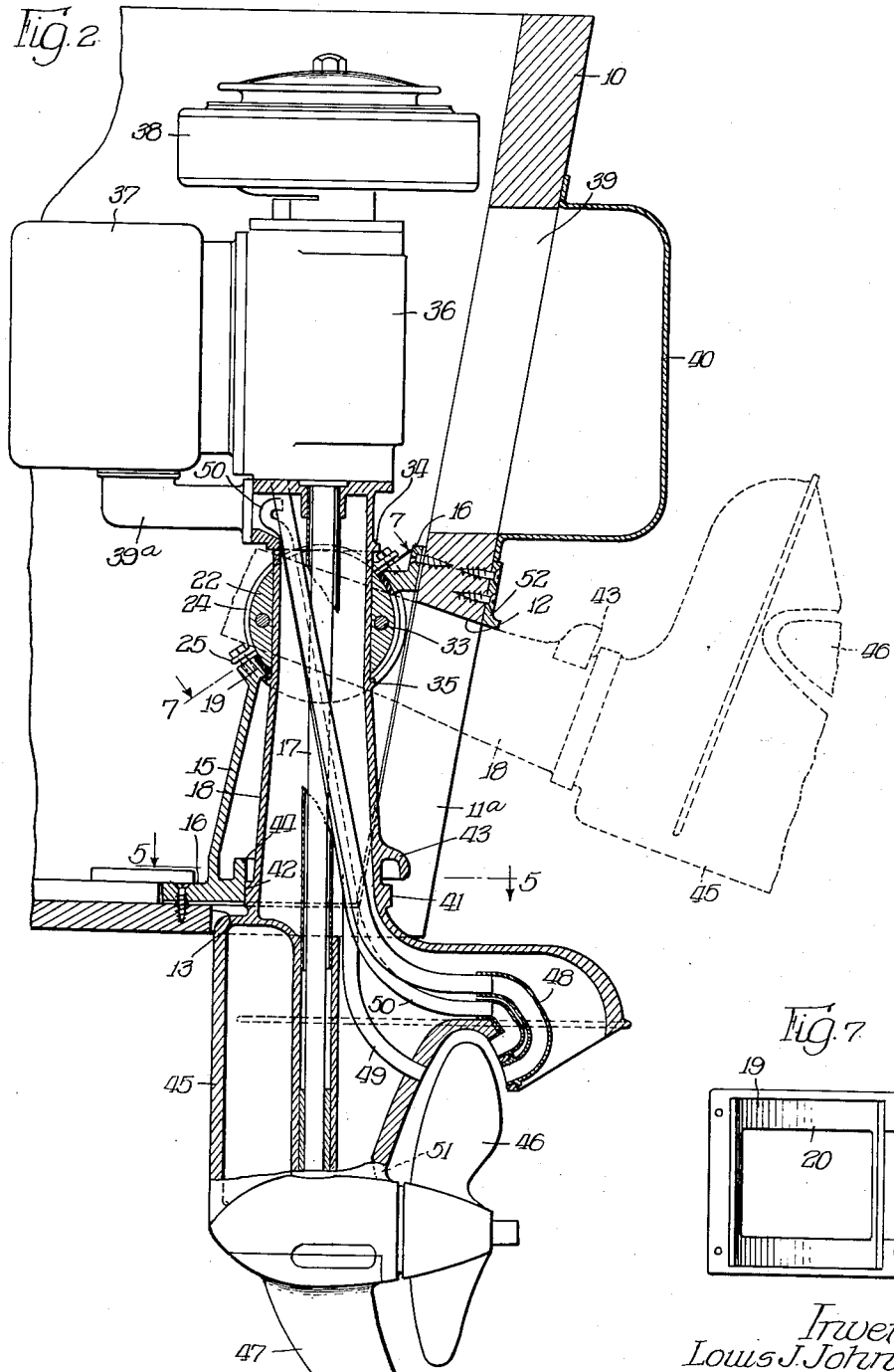
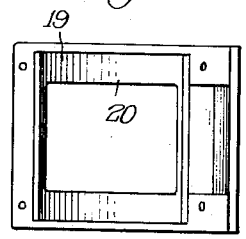
Inventors:
Louis J. Johnson,
Harry L. Johnson, Patented July 23, 1940

2,209,302

UNITED STATES PATENT OFFICE 2,209,302

INBOARD MOTOR PLANT

Louis J. Johnson, Miami, Fla., and Harry L. Johnson, Aubbeenaubbee Township, Fulton County, Ind., assignors to Johnson Brothers Engineering Corporation, Waukegan, Ill., a corporation of Indiana Application February 26, 1937, Serial No. 127,906

37 Claims. (Cl. 115—41)

The present invention relates to improvements in inboard motor plants.

More particularly the present invention relates to the construction of a power plant suitable for installation inboard of a boat, means being provided for permitting the passage of the propeller shaft through the hull of the boat while preventing the ingress of water.

An object of the present invention is to provide an inboard power plant applicable to a boat, which power plant may be reversed through an angle of 180 degrees.

A further object is to provide an inboard power plant which is reversible and which through simple instrumentalities will permit tilting of the power plant when it is performing its normal driving functions but will securely hold said power plant against undesirable tilting when said power plant is reversed.

A further object is to provide an improved power plant which will not interfere with established and approved boat lines and which will not sacrifice the free board of the hull.

A further object is to provide an inboard motor plant for a boat, said plant including a propeller, which plant is tiltable as a unit.

A further object is to provide a power plant for a boat which while retaining the advantage of reversibility and tiltability, has the advantage that the stability of the boat is maintained and cooling of the plant is simplified.

A further object is to provide an improved mounting for a motor plant applicable for either inboard or outboard practice.

A further object is to provide an inboard power plant which is low in cost and simple and certain in operation.

A further object is to provide an inboard power plant which is relatively low in cost and well adapted for manufacture on a commercial scale.

A further object is to provide an improved inboard power plant applicable to boats which plant is efficient and well adapted to meet the requirements encountered in service.

Further objects will appear as the description proceeds.

Referring to the drawings—

Figure 1 is a longitudinal fragmentary view, in section, showing one embodiment of the present invention applied to the stern of a boat;

Figure 2 is a view on an enlarged scale of the structure shown in Figure 1, additional parts being shown in section;

Figure 3 is a sectional view taken along the plane indicated by the arrows 3—3 of Figure 1;

Figure 4 is a sectional view taken along the plane indicated by the arrows 4—4 of Figure 1;

Figure 5 is a sectional view taken along the plane indicated by the arrows 5—5 of Figure 2;

Figure 6 is a sectional view taken along the plane indicated by the arrows 6—6 of Figure 4; and Figure 7 illustrates a detail of construction, said view being taken along the plane indicated by the arrows 7—7 of Figure 2 but omitting certain of the parts appearing in Figure 2.

The numeral 10 indicates the stern wall and the numeral 11 indicates the bottom of a boat. The lowermost portion of the stern wall 10 and the rearmost portion of the bottom 11 are cut out to provide an aperture 11a for the passage of a propeller shaft and its associated housing, the top boundary of said aperture being indicated by the numeral 12, the forward boundary of said aperture being indicated by the numeral 13, and the two side boundaries thereof being indicated by the numerals 14—14.

The power plant which embodies the present invention is adapted to be disposed inwardly of the boat in stop-gap relationship with the aperture 11a. Said power plant includes the supporting member 15, comprising a casting having a flange 16 extending therearound and being adapted to have abutting relationship with the inner surface of the stern 10 and the bottom 11 through any suitable packing material (not illustrated). Said supporting member 15 is provided with a bearing for permitting the tilting of a propeller shaft and its housing, which propeller shaft is indicated by the numeral 17 and which housing is indicated by the numeral 18. The bearing referred to, which is indicated by the numeral 19, is illustrated in side elevation in Figure 1, in cross sectional view in Figure 2, and in plan in Figure 7. Said bearing 19 is a substantially semi-cylindrical bearing which in right line projection takes the form of a substantially rectangular figure, having a substantially rectangular cut out portion 20 disposed symmetrically therein. Said bearing 19 may include a gasket 21 of rubber or the like, which may be vulcanized to the metal of the casting 15 whereby to provide a water-tight trunnion bearing.

The numeral 22 indicates a trunnion adapted to ride upon the bearing 19. Figure 1 shows two mechanisms for holding the trunnion 22 in operative position upon the bearing 19, which mechanisms may be used together or alternatively. One of the holding mechanisms referred to comprises a pair of straps 24—24, each of bowed contour, to conform to the contour of the trunnion 22. Each of said straps is provided at each of its ends with an apertured lug 25 by means of which said straps may be adjustably carried by the casting 15 through the medium of the stud bolts 26—26. In accordance with usual practice, a certain amount of play may be provided between the lugs 25—25 and the casting 15, whereby the tension of the straps 24—24 may be adjusted. When it is desired to tilt the propeller shaft housing 18 for the purpose, for example, of cleaning or repairing the propeller, said straps will hold said housing in tilted position. The other mechanism above referred to for holding the trunnion 22 in engagement with the cylindrical bearing 19 includes a pair of cylindrical studs 27—27 extending coaxially from the two ends of said trunnion 22. Eye-bolts 28—28 engage said cylindrical studs 27—27, which eye-bolts are positioned to exert a pull substantially symmetrical with respect to the bearing 19. Said eye-bolts 28—28 extend through apertured lugs 29—29 forming part of the casting 15, nuts 30 being provided for holding the eye-bolts 28 in position.

The trunnion 22 is divided midway of its length along the plane indicated by the arrows 31—31, the two portions of said trunnion being indicated by the numerals 32—32. Said portions 32—32 are secured together by means of the bolts 33—33.

The trunnion 22 is transversely apertured for the reception of the housing 18 of the propeller shaft 17; the two portions 32—32 of said trunnion being provided with cooperating semi-cylindrical recesses for rotatably receiving a cylindrical portion of said propeller housing 18. Said housing 18 is provided with an upper shoulder 34 and a lower shoulder 35 bearing upon corresponding portions of the trunnion 22 for limiting endwise movement of said housing 18 relative to said trunnion 22. Said trunnion comprises a mounting means for the propeller shaft housing 18 whereby said housing may be turned for steering.

Secured to the upper extremity of the housing 18 is the motor assembly indicated as a whole by the numeral 36, which motor assembly includes the cylinder housing 37 and the fly wheel housing 38. The stern 10 of the boat may be apertured as indicated by the numeral 39 for permitting the full swing of the motor assembly 36 through an angle of 180 degrees, so that said cylinder housing 37 may clear said stern 10. The aperture 39 may be closed by means of the sheet metal cover 40, which will be bowed outwardly a sufficient amount to allow full swing of the cylinder housing 37. Exhaust from the cylinder housing 37 is discharged to the interior of the propeller shaft housing 18 through the conduit 39a. The lower extremity of the propeller shaft housing 18 is open to permit discharge of exhaust gases under water.

The housing 18 is provided adjacent to the bottom of the casting 15 with a cylindrical journal portion indicated by the numeral 41, which journal portion 41 is adapted to contact with a bearing 42 located adacent to the bottom of the casting 15. The rearward side of the housing 18, as the parts are viewed in the normal operation, is provided with a hooked over arcuate portion 43, which, as indicated in Figure 5, extends through a portion of the periphery of a circle something less than 180 degrees. The casting 15 is provided with an upstanding arcuate portion 44 upstanding from the region of the bearing 42. The forwardly presented surface of the arcuate member 44 has a radius only slightly less than the radius of the inwardly presented portion of the arcuate hooked over portion 43 whereby when the motor assembly 36 and the propeller housing 18 are turned through an angle of 180 degrees from that shown in Figure 2, the arcuate hooked over portion 43 will be positioned adjacent to the forwardly presented surface of the arcuate member 44, whereby the propeller housing 18 is effectually held in position when the boat is being propelled rearwardly.

The propeller housing 18 is provided at its lower extremity 45 with a portion formed to provide a bearing for the lower extremity of the propeller shaft 17, and may also be formed to provide a housing for gearing (not shown) for transmitting power to the propeller 46. Said portion 45 may also be provided with the guard 47. Said portion 45 of the propeller housing 18 may be apertured for the reception of the tube 48, which tube is positioned to receive a flow of water directed by the propeller 46 and direct said flow of water up through the cylinder jackets in the cylinder housing 37, whence said water is returned through the tube 49 to be discharged to the suction side of said propeller 46. Another tube 50 may be provided for directing a stream of water set up by the propeller 46 to the upper portion of the propeller housing 18 immediately beneath the motor assembly 36.

The stern 10 may be reinforced by the metal binding member 51 secured to said stern at the upper extremity of the aperture 11a therein. Said reinforcing member 51 may be rigidly secured to said stern and will operate as an abutment to limit tilting movement of the propeller housing 18.

The mode of operation may be briefly described as follows: Normally the propeller housing 18 and motor assembly 36 will be positioned as shown in Figure 2 whereby the propeller 46 may be driven to propel the boat forwardly. The reaction of said propeller 46 against the water will urge the housing 18 forwardly whereby the journal portion 41 of said housing 18 will engage the bearing 42. Steering may be accomplished by turning the motor assembly 36 with the housing 18, this steering action being permitted by the turning movement of the housing 18 within the trunnion 22. If the lower portion 45 of the propeller housing 18 should strike an obstruction, the housing 18 together with the motor assembly 36 will be tilted in a counter-clockwise direction as the parts are viewed in Figure 2, allowing the boat to pass said obstruction, this action being permitted by the rotative action of the trunnion 22 upon the bearing 19 which forms a part of the supporting member 15.

If it is desired to reverse the direction of the boat, the motor assembly 36 may be turned through an angle of 180 degrees, or through a lesser angle if desired, the turning being accomplished in either direction from the normal forward position of said motor assembly 36. After the motor assembly 36 and the housing 18 have been turned through a predetermined angle, the arcuate hooked over portion 43 will engage over the arcuate member 44, whereby the reversed action of the propeller 46 upon the water will cause a pull by said hooked over portion 43 upon the upstanding arcuate member 44, moving the boat in the reverse direction.

The tube 48 will carry cooling water from the propeller up through the cooling jackets of the motor assembly 36, which water will be returned through the tube 49. The tube 50 will receive water from the propeller and will effectually cool the propeller shaft housing 18. Said water delivered by the tube 50 to the upper portion of the housing 18 will gravitate to the lower portion of the housing 18 and flow outwardly through suitable apertures, such as indicated by the numeral 51, in the lower portion of said housing.

The present invention has very decided practical advantages over certain outboard motor constructions which are now in use. For example, the embodiments of the present invention may be installed within the boat, preserving the established and approved boat lines, and will not sacrifice the free board of the hull. The power plant may be enclosed within a compartment and protected from the weather, and said compartment may be locked so that it will not be necessary to remove the power plant from the boat when a boat is left without an attendant.

An adequate supply of fuel can be carried in the power plant, in which matter the invention presents a decided advantage over outboard motor plants as they are now known and used. The structure according to the present invention is very much cleaner to operate than an outboard motor plant as now known and used, because, as indicated above, it may be enclosed and locked within an enclosure and therefore need not be carried. Furthermore, oil and gasoline may be supplied to the inboard power plant much more conveniently than to an outboard motor plant, so that spilling is avoided.

The invention as above described is a more or less permanent part of the boat and does not require an undesirable departure from accepted lines of small boats.

The installation inboard of the boat close to the stern of the boat lends itself to enclosure in a very small compartment, which can be lined with sound-resisting material. The power plant may be disposed in a relatively low position, adding to the stability of the boat, and making more certain the adequate water-cooling of the motor by the very desirable propeller pump system, for the reason that the water does not have to lift to a very great height.

Inasmuch as the inboard power plant according to the present invention is enclosed within the boat, the construction of the power plant may be simplified, it being unnecessary to supply an expensive casing for the power plant, the entire unit is shorter, and the power plant is less expensive than prior constructions of which applicants are aware.

When the propeller shaft is tilted, the propeller is readily accessible either for changing the propeller when required or for removing weeds or the like. A further advantage of the present construction is that it is very adaptable for wheel steering by means of cables.

Further advantages of the present invention are that it provides efficient propeller steering, no separate rudder being required. It also provides an efficient under-water exhaust, which is not practical with other inboard motor plants with which applicants are familiar.

Though a preferred embodiment of the present invention has been described in detail, many modifications will occur to those skilled in the art. It is intended to cover all such modifications that fall within the scope of the appended claims.

What is claimed is:

1. In an inboard power plant, in combination, supporting means adapted to be mounted in water-tight sealing relationship with an aperture between the buoying portion of the hull of a boat and the outside thereof, said supporting means including a tiltable mounting means including a trunnion for rendering said mounting means tiltable, and a propeller shaft housing rotatably carried by said mounting means, said mounting means being split, and securing means for holding said split portions together in bearing relationship with said propeller housing.

2. In an inboard power plant, in combination, supporting means adapted to be mounted within a boat in closing relationship with an aperture in said boat, said supporting means including a tiltable mounting means including a trunnion for rendering said mounting means tiltable, and a tiltable unit comprising a motor and a propeller shaft housing, said housing being rotatably carried by said mounting means, said housing and said supporting means having abutment portions, said abutment portion of said housing being adapted to be positioned in holding relationship with said abutment portion of said supporting means when said housing is turned through a predetermined angle from normal forward propelling position, said abutment portions comprising arcuate members each extending through an arc of less than 180 degrees and being disposed in opposite quadrants of a circle when said propeller is in normal forward propelling position.

3. In combination, supporting means adapted to be mounted in water-tight sealing relationship with an aperture between the buoying portion of a boat and the outside thereof, a unit comprising a motor and a propeller shaft housing, and mounting means for said propeller shaft housing, said mounting means having a trunnion to provide tilting relationship with said supporting means, said propeller shaft housing having turning relationship with said mounting means, said boat being free of obstructions to prevent the turning of said propeller shaft through an angle of 180 degrees from normal forward propelling position.

4. In combination, supporting means adapted to be mounted in water-tight sealing relationship with an aperture between the buoying portion of a boat and the outside thereof, a unit comprising a motor and a propeller shaft housing, and mounting means for said propeller shaft housing, said mounting means having a trunnion to provide tilting relationship with said supporting means, said propeller shaft housing having turning relationship with said mounting means.

5. In combination, supporting means adapted to be mounted in water-tight sealing relationship with an aperture between the buoying portion of a boat and the outside thereof, a unit comprising a motor and a propeller shaft housing, and mounting means for said propeller shaft housing, said mounting means having a trunnion to provide tilting relationship with said supporting means, said propeller shaft housing having turning relationship with said mounting means, said boat being provided with strengthening means for limiting the tilting action of said propeller shaft.

6. In combination, supporting means adapted to be mounted in water-tight sealing relationship with an aperture between the buoying portion of a boat and the outside thereof, a unit comprising a motor and a propeller shaft housing, and mounting means for said propeller shaft housing, said mounting means having a trunnion to provide tilting relationship with said supporting means, said propeller shaft housing having turning relationship with said mounting means, said supporting means having a centrally apertured bearing portion for rotatably receiving said mounting means.

7. In combination, supporting means adapted to be mounted in water-tight sealing relationship with an aperture between the buoying portion of a boat and the outside thereof, a unit comprising a motor and a propeller shaft housing, and mounting means for said propeller shaft housing, said mounting means having a trunnion to provide tilting relationship with said supporting means, said propeller shaft housing having turning relationship with said mounting means, said supporting means having a centrally apertured bearing portion for rotatably receiving said mounting means, said bearing including a gasket integrally united with said supporting means for preventing ingress of water between said supporting means and said mounting means.

8. In combination, supporting means adapted to be mounted in water-tight sealing relationship with an aperture between the buoying portion of a boat and the outside thereof, a unit comprising a motor and a propeller shaft housing, and mounting means for said propeller shaft housing, said mounting means having a trunnion to provide tilting relationship with said supporting means, said propeller shaft housing having turning relationship with said mounting means, said supporting means and said propeller shaft housing having cooperating bearing portions located adjacent to the lower extremity of said supporting means, said propeller shaft housing and said supporting means having cooperating portions adapted to abut when said propeller shaft is turned through a predetermined angle from a normal forward propelling position to prevent tilting of said propeller shaft relative to said supporting means.

9. In combination, supporting means adapted to be mounted in water-tight sealing relationship with an aperture between the buoying portion of a boat and the outside thereof, a unit comprising a motor and a propeller shaft housing, and mounting means for said propeller shaft housing, said mounting means having a trunnion to provide tilting relationship with said supporting means, said propeller shaft housing having turning relationship with said mounting means, said supporting means and said propeller shaft housing having cooperating bearing portions located adjacent to the lower extremity of said supporting means, said propeller shaft housing and said supporting means having cooperating portions adapted to abut when said propeller shaft is turned through a predetermined angle from a normal forward propeller position to prevent tilting of said propeller shaft relative to said supporting means, said cooperating portions including an arcuate member adapted to become operative to prevent tilting when said propeller shaft has been turned through said predetermined angle.

10. A power plant adapted to be mounted within a boat including a propeller shaft housing and a propeller shaft within said housing, a propeller connected to be driven by said shaft, said housing being adapted to extend through the hull of a boat, and supporting means for said power plant, said supporting means including a bearing portion for permitting tilting of said plant only about an axis transverse to the axis of the line of propulsion of said propeller, and a motor at the top of said housing secured to said housing and movable as a unit therewith.

11. A power plant adapted to be mounted within a boat comprising a motor, a propeller shaft housing extending therefrom and movable as a unit therewith, a propeller shaft within said housing, a propeller adapted to be driven by said shaft, said housing being adapted to extend through the hull of a boat, supporting means for said housing having sealing relationship with said hull, said supporting means including a bearing of cylindrical contour permitting a tilting action of said propeller shaft housing, and means for preventing the passage of water along said bearing, said supporting means also including mounting means for said propeller shaft housing, said propeller shaft housing being turnable for steering in said mounting means.

12. A power plant adapted to be mounted within a boat comprising a motor, a propeller housing extending therefrom, a propeller shaft within said housing, a propeller adapted to be driven by said shaft, said housing being adapted to extend through the hull of a boat, and supporting means for said housing having sealing relationship with said hull, said supporting means including a cylindrical bearing portion permitting a tilting action of said propeller shaft housing around a transverse axis, means for preventing the passage of water along said cylindrical bearing, said housing being capable of a turning action about an axis transverse to said first mentioned axis.

13. An inboard power plant for a boat comprising, in combination, a propeller, a propeller shaft, a motor for driving said propeller shaft, and supporting means for said motor, shaft and propeller, said motor, shaft and propeller being mounted for tilting movement in unison upon said supporting means, said supporting means including a trunnion whereby to be tiltable, said supporting means being adapted to be mounted in water-tight sealing relationship with an aperture between the buoying portion of said boat and the outside thereof.

14. An inboard power plant for a boat comprising, in combination, a propeller, a propeller shaft, a motor for driving said propeller shaft, and supporting means for said motor, shaft and propeller, said motor, shaft and propeller being mounted for tilting movement in unison upon said supporting means, said supporting means being adapted to be mounted in water-tight sealing relationship with an aperture between the buoying portion of said boat and the outside thereof, said supporting means including a centrally apertured bearing of cylindrical contour adapted to prevent the passage of water along said bearing.

15. An inboard power plant for a boat comprising, in combination, a propeller, a propeller shaft, a motor for driving said propeller shaft, supporting means for said motor, shaft and propeller, said motor, shaft and propeller being mounted for tilting movement in unison upon said supporting means, said supporting means being adapted to be mounted in water-tight sealing relationship with an aperture between the buoying portion of said boat and the outside thereof, said supporting means including a centrally apertured bearing of cylindrical contour adapted to prevent the passage of water along said bearing, and clamping means adapted to hold said motor, shaft and propeller releasably in tilted position.

16. An inboard power plant for a boat comprising a motor, a drive shaft housing extending from said motor, a propeller mounted upon said housing, and supporting means for said housing adapted to be disposed in water-tight sealing relation with an aperture in the hull of a boat, said supporting means including a bearing of cylindrical contour for supporting said housing while permitting the tilting of said housing, motor and propeller as a unit relative to said supporting means, and preventing the ingress of water into said boat when said unit is tilting.

17. An inboard power plant for a boat comprising a motor, a drive shaft housing extending from said motor, a propeller mounted upon said housing, and supporting means for said housing adapted to be disposed in sealing relation with an aperture in the hull of a boat, said supporting means including a bearing of cylindrical contour for supporting said housing while permitting the tilting of said housing, motor and propeller as a unit relative to said supporting means, said supporting means including clamping means for yieldably holding said housing, motor and propeller in tilted position, said bearing being adapted to prevent the passage of water therealong.

18. An inboard power plant for a boat comprising a motor, a drive shaft housing extending from said motor, a propeller carried by said housing, supporting means for said motor and said housing, said supporting means being adapted to have water-tight sealing relationship with an aperture between the buoying portion of the hull of a boat and the outside thereof, said supporting means including mounting means for permitting turning of said housing for steering purposes, and water-tight bearing means of cylindrical contour for permitting the tilting of said housing to a position angularly disposed with respect to the axis of steering of said housing.

19. In an inboard power plant, in combination, supporting means adapted to be mounted within a boat in water-tight sealing relationship with an aperture in said boat, said supporting means including a water-tight bearing portion of cylindrical contour and a tiltable unit carried by said bearing portion, said unit including a motor, a propeller shaft housing, a propeller shaft and a propeller, said plant including a bearing portion for permitting a turning movement of said housing for steering functions.

20. In an inboard power plant, in combination, supporting means adapted to be mounted within a boat in water-tight sealing relationship with an aperture between the buoying portion of the hull of said boat and the outside thereof, said supporting means including a mounting means having a bearing portion of cylindrical contour and a unit comprising a motor, a propeller shaft housing, a propeller shaft and a propeller, said unit being tiltably and rotatably carried by said mounting means.

21. In combination, supporting means adapted to be mounted in water-tight sealing relationship with an aperture between the buoying portion of a boat and the outside thereof, a tiltable unit including a motor and a propeller shaft housing, and mounting means for said propeller shaft housing, said mounting means having tilting relationship with said supporting means, said mounting means including a water-tight bearing of cylindrical contour for providing said tilting relationship while preventing access of water through said bearing.

22. In combination, supporting means adapted to be mounted in water-tight sealing relationship with an aperture between the buoying portion of a boat and the outside thereof, a tiltable unit including a motor and a propeller shaft housing, and mounting means for said propeller shaft housing, said mounting means having tilting relationship with said supporting means, said mounting means being provided with a water-tight bearing of cylindrical contour providing said tilting relationship while preventing access of water through said bearing, said boat being provided with strengthening means for limiting the tilting action of said propeller shaft.

23. In combination, supporting means adapted to be mounted in water-tight sealing relationship with an aperture between the buoying portion of a boat and the outside thereof, a tiltable unit including a motor and a propeller shaft housing, and mounting means for said propeller shaft housing, said mounting means having tilting relationship with said supporting means, said supporting means having a centrally apertured water-tight bearing portion of cylindrical contour for rotatably receiving said mounting means and a motor at the top of said housing disposed within said boat and protected against water by reason of said stop-gap relationship.

24. In combination, supporting means adapted to be mounted in water-tight sealing relationship with an aperture between the buoying portion of a boat and the outside thereof, a tiltable unit including a motor and a propeller shaft housing, and mounting means for said propeller shaft housing, said mounting means having tilting relationship with said supporting means, said supporting means having a centrally apertured cylindrical water-tight bearing portion for rotatably receiving said mounting means, said bearing including a gasket integrally united with said supporting means for preventing ingress of water between said supporting means and said mounting means.

25. In combination, mounting means for a motor plant comprising means adapted to be connected to a boat, said mounting means including a semi-cylindrical bearing portion, a trunnion member adapted to rotate in said bearing portion, bowed strap members for holding said trunnion in cooperative relationship with said bearing portion, adjustable holding means for modifying the action of said bowed members, and a power unit including a motor, a drive shaft casing and a propeller, said unit being rotatably mounted in said trunnion member about an axis transverse to the axis of rotation of said trunnion member.

26. In combination, supporting means adapted to be disposed in water-tight sealing relationship with an aperture between the buoying portion of a boat and the outside thereof, said supporting means being provided with a cylindrical bearing, a power plant having a cylindrical bearing portion resting upon said bearing whereby said power plant is supported by said supporting means, and adjustable means for holding the bearing portion of said power plant in water-tight engagement with said bearing.

27. In combination, supporting means adapted to be mounted in water-tight sealing relationship with an aperture between the buoying portion of a boat and the outside thereof, said supporting means being provided with a bearing, a propeller shaft housing, mounting means for said housing permitting turning movement therein of said housing, said mounting means including trunnion means whereby to be capable, when said housing strikes an obstruction, of tilting action within said bearing about an axis disposed transversely with respect to the axis of turning movement of said housing, and a motor at the top of said housing secured to said housing and movable as a unit with said housing.

28. In combination, supporting means adapted to be mounted in water-tight sealing relationship with an aperture between the buoying portion of a boat and the outside thereof, said supporting means being provided with a bearing, a propeller shaft housing, mounting means for said housing permitting turning movement therein of said housing, said mounting means being capable, when said housing strikes an obstruction, of tilting action within said bearing about an axis disposed transversely with respect to the axis of turning movement of said housing, and a motor at the top of said housing secured to said housing and movable as a unit with said housing, said bearing comprising a frame having a cylindrical surface centrally apertured to permit the passage of said housing.

29. In combination, supporting means adapted to be mounted in water-tight sealing relationship with an aperture between the buoying portion of a boat and the outside thereof, said supporting means being provided with a bearing portion of cylindrical contour, a propeller shaft housing, a mounting portion for said housing permitting turning movement therein of said housing, said mounting portion being capable, when said housing strikes an obstruction, of tilting action relative to said bearing portion about an axis disposed transversely with respect to the axis of turning movement of said housing, and a motor at the top of said housing secured to said housing and movable as a unit with said housing, said bearing portion comprising a frame centrally apertured to permit the passage of said housing, one of said portions having a gasket secured thereto providing a bearing surface.

30. In an inboard power plant, in combination, supporting means adapted to be mounted in water-tight sealing relationship with an aperture between the buoying portion of the hull of a boat and the outside thereof, and a unit comprising a motor, a propeller shaft housing, a propeller shaft, and a propeller, said unit being rotatably carried by said mounting means, said mounting means including structure whereby it is tiltable relative to said supporting means, when said unit strikes an obstruction, only about an axis transverse to the axis of thrust of said propeller.

31. In an inboard power plant, in combination, supporting means adapted to be mounted in water-tight sealing relationship with an aperture between the buoying portion of a boat and the outside thereof, said supporting means including a mounting means, said supporting means including a trunnion whereby said mounting means is tiltable, and a tiltable unit comprising a motor and a propeller shaft housing, said housing having an abutment portion and a cooperating abutment portion adapted to be carried by said boat, said abutment portion of said housing being adapted to be positioned in holding relationship with said cooperating abutment portion when said housing is turned through a predetermined angle from normal forward propelling position, said abutment portions comprising arcuate members each extending through an arc of less than 180 degrees and being disposed in opposite quadrants of a circle when said propeller is in normal forward propelling position.

32. In combination, supporting means adapted to be connected to a boat, said supporting means being provided with a cylindrical bearing, a power plant having a cylindrical bearing portion resting upon said bearing whereby said power plant is tiltably supported by said supporting means, and adjustable means for holding said bearing portion of said power plant within said cylindrical bearing, said power plant including a propeller shaft housing, said housing having a portion thereof extending through said cylindrical bearing portion in turning relationship therewith.

33. In combination, a marine power unit including a motor and a drive shaft housing rigidly attached to said motor, a drive shaft within said housing and a propeller adapted to be driven by said drive shaft, a trunnion, said housing having a portion extending through said trunnion and turnable within said trunnion, and a bearing member adapted to be secured to a boat for swingingly supporting said trunnion.

34. In combination, a marine power unit including a motor and a drive shaft housing rigidly attached to said motor, a drive shaft within said housing and a propeller adapted to be driven by said drive shaft, a trunnion-like member, said housing having a portion extending through said trunnion-like member and turnable within said trunnion-like member, and a bearing member adapted to be secured to a boat for swingingly supporting said trunnion-like member, said bearing member comprising a semi-cylindrical bearing including an apertured frame-like member, said housing extending through the aperture thereof.

35. In combination, a marine power unit including a motor and a drive shaft housing rigidly attached to said motor, a drive shaft within said housing and a propeller adapted to be driven by said drive shaft, a trunnion-like member, said housing having a portion extending through said trunnion-like member and turnable within said trunnion-like member, and a bearing member adapted to be secured to a boat for swingingly supporting said trunnion-like member, said trunnion-like member being split into a plurality of portions to facilitate the assembly and disassembly of said housing relative to said trunnion.

36. In combination, a marine power unit including a motor and a drive shaft housing rigidly attached to said motor, a drive shaft within said housing and a propeller adapted to be driven by said drive shaft, a trunnion, said housing having a portion extending through said trunnion and turnable within said trunnion, a bearing member adapted to be secured to a boat for swingingly supporting said trunnion, and bowed members for adjustably holding said trunnion relative to said bearing member.

37. In combination, a marine power unit including a motor and a drive shaft housing rigidly attached to said motor, a drive shaft within said housing and a propeller adapted to be driven by said drive shaft, a trunnion-like member, said housing having a portion extending through said trunnion-like member and turnable within said trunnion-like member, and a bearing member adapted to be secured to a boat for swingingly supporting said trunnion-like member, said bearing member comprising a semi-cylindrical bearing including an apertured frame-like member, said housing extending through the aperture thereof, said aperture being elongated in the direction of swing of said trunnion-like member to provide clearance for swing of said housing.

LOUIS J. JOHNSON.
HARRY L. JOHNSON.

CERTIFICATE OF CORRECTION.

Patent No. 2,209,302. July 23, 1940.

LOUIS J. JOHNSON, ET AL.

It is hereby certified that error appears in the printed specification of the above numbered patent requiring correction as follows: Page 4, first column, line 52, claim 9, for the word "propeller" read --propelling--; page 5, second column, lines 18 to 21, claim 23, strike out the words "and a motor at the top of said housing disposed within said boat and protected against water by reason of said stop-gap relationship" and insert the same after "means" and before the period in line 36, claim 24; line 61, claim 27, for "suporting" read --supporting--; and that the said Letters Patent should be read with this correction therein that the same may conform to the record of the case in the Patent Office.

Signed and sealed this 24th day of September, A. D. 1940.

(Seal)

Henry Van Arsdale,
Acting Commissioner of Patents.